Sept. 19, 1950  R. A. PALMER  2,522,958

DYNAMIC BALANCING

Filed May 20, 1948

INVENTOR.
RALPH A. PALMER

BY Edward Thomas
ATTORNEY

Patented Sept. 19, 1950

2,522,958

UNITED STATES PATENT OFFICE 2,522,958

DYNAMIC BALANCING

Ralph A. Palmer, St. Joseph, Mich.

Application May 20, 1948, Serial No. 28,242

7 Claims. (Cl. 74—573)

This invention relates to the dynamic balancing of rapidly rotating machine parts and is herein illustrated in some detail as embodied in a simple device adapted to be mounted upon a rotating shaft.

One object of the invention is to provide a low cost device adapted to be included in mechanical set-ups to overcome minor unbalances, such as often arise when such set-ups are mass-produced. Thus the present invention makes it unnecessary to carry out expensive machining operations on certain parts of a mass-produced device in order that those parts may operate in balance, although the rest of the device needs no such close tolerance in workmanship.

The invention also may provide a device for automatically compensating for many minor unbalances; may provide a cheap method of reducing radial loads imposed by unbalance; may so improve balancing of parts that less material is needed, less size required for strength, and less weight is needed in machine bases, in machine frames, in bearing mountings, and shafts; and vibration will be vastly reduced or eliminated.

The invention is well adapted to be incorporated at or near bearing points carrying a normally uniform torque or radial load, such as a propeller shaft, fan, or grinding wheel shaft, and is not always applicable where unbalance comes from the side pull of a belt or gear load or weight of a vehicle.

The invention is most readily applicable at bearing points where radial motion of the shaft of the order of several thousandths of an inch or more is permissible. This radial motion of the shaft actuates the balancing sleeve, moving its longer end and center of mass a greater distance in the opposite radial direction. The slight off-center rotation of the shaft and sleeve, on opposite sides of the axis of rotation and in overall dynamic balance, would be preferable in many cases to permitting vibration and to heavy construction otherwise needed to withstand strains due to unbalance.

The invention seems especially adapted to high speed light shafting, say 600 R. P. M. and higher.

The device is simple, and adapted to be built economically in mass production where economy is desirable, and fine adjustment of separate parts will usually be found to be unnecessary. Usually any accurate or other desirable adjustments are easily made after the device is installed.

Other features and advantages will hereinafter appear.

Figure 1:
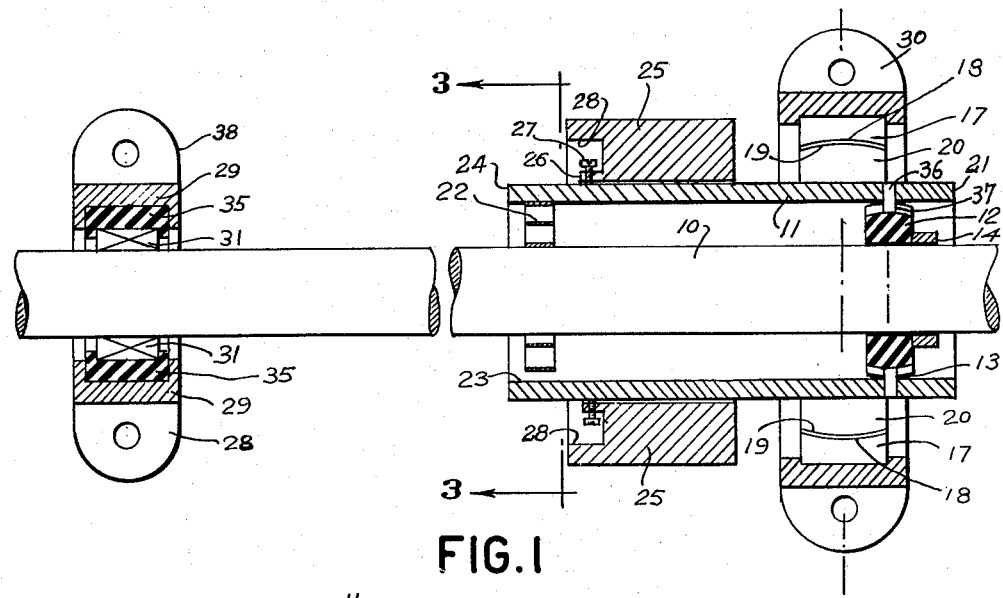
Fig. 1 is a sectional side view of the device as installed.
Figure 2:
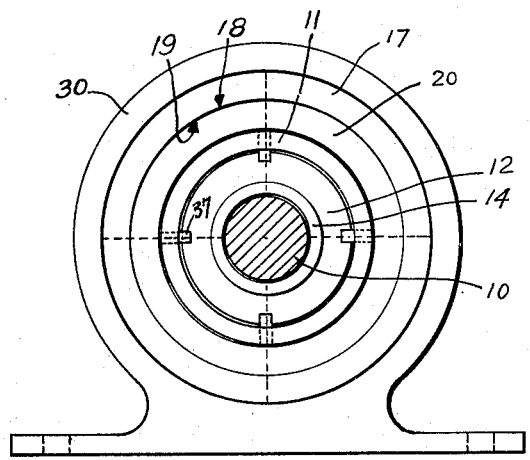
Fig. 2 is a diagrammatic sectional end view.
Figure 3:
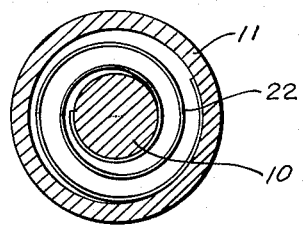
Fig. 3 is a sectional view on the line 3—3 of Fig. 1.
Figure 4:
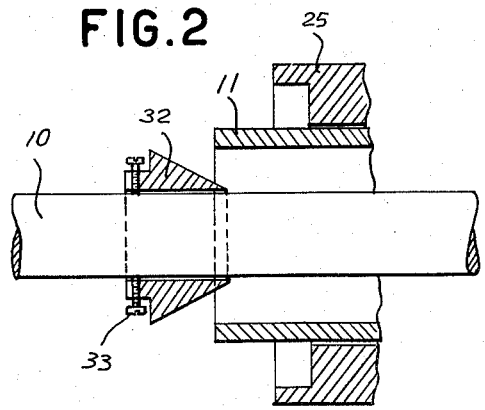
Fig. 4 shows a modification.

A drive or other shaft 10 is shown as carrying a primary balancing member 11, usually, as shown, in the form of a sleeve 11, of substantial weight, considerably longer than its diameter, and considerably larger in internal diameter than the shaft diameter, and adapted to be driven to rotate with the shaft 10 by a flexible coupling 12.

The flexible coupling 12 is diagrammatically shown as including a spherical friction member 13 lying against the sleeve 11 and driven by a sleeve 14 fixed to the shaft through a flexible element shown as a highly flexible rubber element 12.

The shaft 10, therefore, drives the sleeve 11. The sleeve 11 is shown as journalled on a fixed bearing 17 having a hollow spherical face 18, in which turns the outer spherical face 19 of a journal member 20 fast on the sleeve 11, so that the sleeve 11 is free to swing its axis on the center of the sphere having the face 19.

The device is shown with the center of sphere 19 near the end 21 of the sleeve 11, and the center of the sphere 13 is shown still nearer that end.

The device is shown as also including a device such as a coil spring 22 bearing on the shaft 10 and tending to press outwardly on the inner face 23 near the opposite end 24 of the sleeve 11.

Thus the spring 22 has some tendency to center the sleeve 11 on the shaft 10, and thus co-operate in bringing the shaft to a true center.

The centrifugal effect of a light sleeve 11 may be readily increased by providing it with a uniformly weighted collar 25, preferably slidable along the sleeve and provided with a pair of balanced opposing lugs 26 so that at least one lug 26 may carry a set screw 27 under an overhang 28 of the collar and protected by the overhang.

The shaft 10 is diagrammatically shown as turning in a conventional hanger 38 which carries a journal member 29 on which runs the journal member 31 carried by the shaft. Thus the hanger 38 provides a fixed bearing for the shaft at some distance from the hanger 30 which carries the bearing member 17. There may be interposed a rubber or other cushion member 35.

The cone 32 alternately shown on the shaft 10 may be an elastic or resilient member adjustable by a set screw 33 to limit the "wabble" of the sleeve or collar 25 to any suitable extent, instead of the spring 22.

Ordinarily, for general machine shop work, many of the parts may be split and adapted to be bolted together so they can be assembled on a shaft after the shaft is set up. The details of such bolts and splits are omitted for the sake of clearness.

The above is a description of a simple form of the invention which is believed to operate as follows:

When centrifugal forces are balanced in the sleeve, and an unbalanced centrifugal force urges the shaft down, the unbalanced force is transmitted downward through the flexible coupling.

The downward urging of the flexible coupling swings the free end of the sleeve upward, so the free end presses upward neutralizing the downward unbalance of the shaft partly through gyroscopic action of the rotating weight of sleeve, and partly through the springs which are compressed when on the under side of the shaft.

With the upward unbalanced centrifugal force in the rotating sleeve, the gyroscopic force in the sleeve and its resultants, the restoring force is applied upwardly at the flexible coupling and at the springs, so the net unbalanced force on the shaft acts to move it toward centered position at axis of rotation and to move the sleeve back toward centered position until radial forces are balanced.

A balanced position will arise where unbalanced forces in shaft and of sleeve on shaft are equal and opposite, so the net radial force on bearing 17 approaches zero.

Here any change in value of force in sleeve or in shaft, creating initial unbalance, causes movement of center of mass radially in direction which automatically restores balance.

The sleeve 11 may be driven by pins or lugs 36 fixed to it and riding in slots 37 in the sleeve 12 to allow for more freedom to turn.

Having thus described one embodiment of the invention, what is claimed is:

1. The combination with a rotatable shaft, of a sleeve rotatable co-axially with the shaft, a flexible coupling causing them to rotate together, a journal in which the sleeve is rotatably supported off the coupling center and adapted to swing transversely of its axis, and a yielding device tending to swing the sleeve relative to the shaft so they revolve on the same axis.

2. The combination with a rotatable shaft, of a sleeve rotatable axially with the shaft, a flexible coupling causing them to rotate together, a spherically faced journal in which the sleeve is rotatably supported off the coupling center and adapted to swing transversely of its axis, and a yielding device tending to swing the sleeve relative to the shaft so they revolve on the same axis.

3. The combination with a rotatable shaft, of a sleeve rotatable axially with the shaft, a flexible coupling causing them to rotate together, a journal in which the sleeve is rotatably supported off the coupling center and adapted to swing transversely of its axis, and a yielding spring device tending to swing the sleeve relative to the shaft so they revolve on the same axis.

4. The combination with a rotatable shaft, of a sleeve rotatable axially with the shaft, a flexible coupling yielding radially causing them to rotate together, a journal in which the sleeve is rotatably supported off the coupling center and adapted to swing transversely of its axis, and a yielding device tending to swing the sleeve relative to the shaft so they revolve on the same axis.

5. The combination with a rotatable shaft, of a sleeve rotatable axially with the shaft, a flexible coupling causing them to rotate together, a journal in which the sleeve is rotatably supported off the coupling center and adapted to swing transversely of its axis, a yielding device tending to swing the sleeve relative to the shaft so they revolve on the same axis, and a balanced weight adjustable along the sleeve to vary its gyroscopic effect.

6. The combination with a rotatable shaft, of a hanger in which it rotates, a second hanger in which it rotates, a sleeve of substantial weight journalled around the shaft in one hanger and adapted to swing on its journal, and a flexible coupling causing the sleeve to turn with the shaft and a weight adjustable along the sleeve to vary its momentum of its throw, and resilient means adapted to tend to move the sleeve towards the center of the shaft.

7. The combination with a rotatable shaft, of a sleeve rotatable axially with the shaft, a flexible coupling causing them to rotate together, a journal for the sleeve on which the sleeve is adapted to swing transversely of its axis between the coupling and the longer end of the sleeve, and a weight adjustable on the sleeve to vary its momentum, and resilient means adapted to tend to move the sleeve towards the center of the shaft.

RALPH A. PALMER.

REFERENCES CITED

The following references are of record in the file of this patent:

UNITED STATES PATENTS

| Number | Name | Date |
| --- | --- | --- |
| 1,364,994 | Johnson | Jan. 11, 1921 |
| 1,754,252 | Altorfer | April 15, 1930 |
| 1,838,501 | Schiff | Dec. 29, 1931 |
| 2,249,292 | Kapitza | July 15, 1941 |
| 2,441,619 | Dailey et al. | May 18, 1948 |